United States Patent Office 2,851,344
Patented Sept. 9, 1958

2,851,344
FUEL OIL COMPOSITIONS

Byron E. Marsh, Berwyn, and Paul L. Du Brow, Richard L. Betcher, Frederick W. Smith, and Arthur Cizek, Chicago, Ill., assignors to Armour and Company, Chicago, Ill., a corporation of Illinois No Drawing. Application February 2, 1955
Serial No. 485,802

20 Claims. (Cl. 44—71)

This invention relates to improved fuel oil compositions.

It is well known that hydrocarbon fuel oils, such as those used in burner systems, diesel and combustion engines and other industrial and domestic equipment, are per se subject to numerous shortcomings due to chemical deterioration and impurities, either introduced or not removed in processing. For example, the oils tend, in the presence of water, to become corrosive to metallic surfaces after short periods of storage or exposure to the atmosphere. Many oils tend to develop undesirable solids or sludge which deleteriously affects the usefulness of the oils, either by diminution of their combustive capacity or by their tendency to clog the filters present in the equipment being employed. The petroleum industry has attacked the problem of improving compositions from several angles. One is improved processing techniques; another is blending of oils; still another, which is somewhat akin to the second, is the addition of chemical agents.

The quest of the petroleum industry for additives for fuel oils to improve their properties has been and continues to be a tedious and not too rewarding proposition. Part of the reason for this is the multitude of functions which an additive must perform. Besides being compatible with the oil, an additive should, in order of desirability and importance, (1) improve the filterability of the oil; (2) inhibit the formation of sludge; (3) stabilize the color of the oil; (4) inhibit corrosion; and (5) prevent emulsification of any water which may be present in the oil. Needless to say, the job of finding an additive agent which will perform all of the aforementioned functions is like looking for a needle in a haystack. There seems to be no way of predicting that a given chemical will or should perform as desired. That is, it cannot be predicted that a chemical known to be a good corrosion inhibitor will also inhibit the formation of sludge, or vice versa. One solution might be to employ a mixture of additive agents, each for their own particular function. However, this is no simple matter when the problem of chemical and physical compatibility and the multiplicity of functions is considered. To our knowledge, no one has ever provided a single chemical, or mixture of chemicals, as an additive for fuel oil which satisfactorily performs all of the functions hereinbefore outlined.

In accordance with the present invention, we have quite unexpectedly and gratifyingly discovered a whole family of compounds, the members of which perform the above-mentioned functions in a combined degree heretofore unobtainable by previously known fuel oil additives. Some of these compounds are new in themselves and are described and claimed in the copending application of Paul L. Du Brow and Frederick W. Smith, filed February 2, 1955, Serial No. 485,801.

It is therefore, an object of this invention to provide improved fuel oil compositions.

The basic structure of the chemical compounds which we employ in our improved fuel oil additives can be represented by the general formula RNH(CH$_2$)$_n$NH—A—COOH, wherein A is a divalent hydrocarbon radical having from 2 to 3 carbon atoms, $n$ is an integer of from 2 to 5, and R is a radical of the group consisting of (A) aliphatic hydrocarbon radicals having from 8 to 22 carbon atoms, and (B) hydrocarbon radicals as derived from rosin and tall oil acids. Examples of radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, mixtures of the foregoing radicals as derived from tallow, soybean oil, coconut oil, and other animal and vegetable oil acids, and hydrocarbon radicals as derived from the acids of rosin and tall oil, such as abietic acid, dehydroabietic acid, dihydroabietic acid, and tetrahydroabietic acid.

The above basic compounds can be prepared by reacting a N-substituted alkylene diamine with a lower unsaturated acid, such as acrylic acid, methacrylic, and crotonic acid. The reaction between a N-substituted alkylene diamine and an unsaturated acid, such as crotonic acid, can be illustrated as follows:

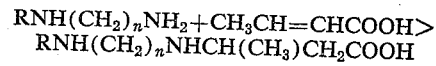

It will be seen from the foregoing equation that the reaction is essentially an addition reaction, the primary amine group of the N-substituted alkylene diamine adding across the double bond of the acid. When preparing the basic compounds according to the foregoing equation, the preferred diamines are N-aliphatic trimethylene diamines sold by Armour and Company under the trade name Duomeen. The preferred unsaturated acid is crotonic acid. However, other lower unsaturated acids, or their lower alkyl esters, can be employed.

We have also discovered that the alkali metal and alkaline earth metal salts of the basic compounds as hereinbefore described are extremely effective when added to fuel oils. In this category are included the potassium, lithium, sodium, calcium and magnesium salts of the basic compounds. The preferred metal salts are the sodium and calcium derivatives.

Other salts of the basic compounds which can be effectively added to fuel oils in accordance with our invention include the monoamine and diamine salts wherein the monoamine is either primary, secondary, or tertiary and of the formulae RNH$_2$, R$_2$NH and R$_3$N, and the diamine is of the formula R'NH(CH$_2$)$_n$NH$_2$, wherein R can be aliphatic hydrocarbon radicals having from 1 to 22 carbon atoms, or a hydrocarbon radical as derived from rosin or tall oil acids, R' can be any aliphatic hydrocarbon radical having from 8 to 22 carbon atoms or a hydrocarbon radical as derived from rosin or tall oil acids, and $n$ is an integer of from 2 to 5. Examples of the higher aliphatic hydrocarbon and rosinyl radicals within the foregoing definition are the same as hereinbefore mentioned. Examples of lower hydrocarbon radicals include methyl, ethyl, propyl, isopropyl, butyl, isobutyl, pentyl, etc. The preferred monoamine salts are salts of the basic compounds and secondary amines, such as di-n-butyl amine and di-coco-amine. Preferred diamine salts are salts of the basic compounds and N-aliphatic trimethylene diamines. The amine salts, generally, can be made by mixing equimolar quantities of the basic compound and the desired amine, and heating slightly.

Other members of the family of compounds which can be effectively added to fuel oils in accordance with our invention include the lower alkyl esters of the basic compounds, such as the methyl ester, the ethyl ester, the propyl ester, the isopropyl ester, the butyl ester, and the isobutyl ester. These compounds can be prepared by reacting the appropriate ester of an unsaturated acid, as hereinbefore defined, with the N-substituted alkylene diamine, as described in connection with the preparation of the basic compound.

The quantity of the chemical which can be added to the fuel oil in accordance with the present invention can vary within wide limits, depending upon the nature of the oil to which it is to be added, and the use to which the oil is to be put. While the concentration of the added chemical may be as low as about 25 parts per million and as high as 1% or 2%, we prefer, in the case of a domestic fuel oil, to add between about 50 and about 100 parts per million of chemical additive. Our chemical additives are in general oil soluble, and to a degree sufficient to provide the desired concentration of additive in the resulting fuel oil.

The following examples will help to illustrate the underlying principles of our invention and are not intended to be unduly limiting thereof.

*Example I*

Two samples of a domestic fuel oil comprised of a 50–50 blend of straight run and catalytically cracked distillates, one sample containing additionally 50 parts per million of a compound having a formula $$RNH_2CH_2CH_2CH_2NHCH(CH_3)CH_2COOH$$

wherein R is a mixture of radicals derived from soybean acids, were subjected to ultra-violet irradiation in an open vessel for 7 hours using nitrogen for agitation. The temperature of the oil during the irradiation treatment was about 115° F. The samples were then allowed to stand protected from light at room temperature for approximately 17 hours after which time the filterability and quantity of insoluble sludge were determined. The filterability was determined by measuring the time required to filter 100 cc. of the oil through 10-micron filter paper, maintaining a constant head of liquid during the filtration. The control sample had a filterability of 585 seconds/100 cc. The test sample had a filterability of 290 seconds/100 cc.

The quantity of insoluble sludge was determined by filtering a measured quantity of the oil through a sintered-glass crucible, rinsing the crucible free of fuel oil with filtered mineral spirits, drying the crucible to constant weight at 240° F. and determining the increase in weight of the crucible. The control sample contained 64.5 mg. of insoluble sludge per liter of oil. The test sample contained 3.5 mg. of insoluble sludge per liter of oil.

The emulsification characteristics of the test sample was determined by putting 20 cc. of distilled water and 80 cc. of the oil containing the additive in a graduated cylinder, stoppering the same and inverting it about 15 times to form an emulsion, and measuring the time necessary for the emulsion to break to a 2 cc. interface. An oil is acceptable in this respect if the time required is less than 4½ minutes, and good if the time is between 1½ and 2½ minutes. The present test sample demonstrated good emulsification properties.

These samples were further tested by subjecting the same to a temperature of 150 to 180° F., in vented containers, for a period of 72 hours, observing visually the sludge formation, and determining a final NPA color. The control sample had an initial NPA color of 1+, a final NPA color of 4, and exhibited heavy sludge formation. The test sample had an initial NPA color of 1+, a final NPA color of 2½, and exhibited only very slight sludge formation.

*Example II*

Two samples of a domestic fuel oil comprised of a 50–50 blend of straight run and catalytically cracked distillates, one sample containing additionally 50 parts per million of the sodium salt of the compound having the formula $$RNH_2CH_2CH_2CH_2NHCH(CH_3)CH_2COOH$$

wherein R is a mixture of radicals derived from tallow acids, were tested in the manner described in Example I. The control sample had a filterability of 600 seconds/100 cc. and contained 64.5 mg. of insoluble sludge per liter of oil. The test sample had a filterability of 115 seconds/100 cc. and contained 1.0 mg. of insoluble sludge per liter of oil.

The test sample exhibited excellent emulsification characteristics.

After subjection to high temperature for 72 hours, the control sample exhibited heavy sludge formation and had a final NPA color of 3+ as opposed to an initial NPA color of 1+. The test sample exhibited no visual sludge formation and had a final color of 2− as opposed to an initial NPA color of 1+.

*Example III*

Two samples of a domestic fuel oil comprised of a 50–50 blend of straight run and catalytically cracked distillates, one sample containing additionally 50 parts per million of the calcium salt of the compound having the formula $$RNH_2CH_2CH_2CH_2NHCH(CH_3)CH_2COOH$$

wherein R is a mixture of radicals derived from soybean acids, were tested in the manner described in Example I. The control sample had a filterability of more than 500 seconds/100 cc. and contained 59.0 mg. of insoluble sludge per liter of oil. The test sample had a filterability of 149 seconds/100 cc. and contained 20.5 mg. of insoluble sludge per liter of oil.

The test sample exhibited excellent emulsification characteristics.

After subjection to high temperature for a period of 72 hours, the control sample exhibited heavy visual sludge formation and had a final NPA color of 4+ as opposed to an initial NPA color of 1+. The test sample exhibited no visual sludge formation and had a final NPA color of 2½+ as opposed to an initial NPA color of 1+.

*Example IV*

Two samples of a domestic fuel oil comprised of a 50–50 blend of straight run and catalytically cracked distillates, one sample containing additionally 50 parts per million of the secondary di-n-butyl amine salt of a compound having the formula $$RNH_2CH_2CH_2CH_2NHCH(CH_3)CH_2COOH$$

wherein R is a mixture of radicals derived from tallow acids, were subjected to a temperature of about 150 to 180° F., in vented containers, for a period of 72 hours. The control sample exhibited heavy visual sludge formation and had a final NPA color of 3+ as opposed to an initial NPA color of 1+. The test sample exhibited no visual sludge formation and had a final NPA color of 2 as opposed to an initial NPA color of 1+.

The test sample exhibited excellent emulsification characteristics which were determined in the manner described in Example I.

*Example V*

Two samples of a domestic fuel oil comprised of a 50–50 blend of straight run and catalytically cracked distillates, one sample containing additionally 100 parts per million of the N-tallow trimethylene diamine salt of the compound having the formula $$RNH_2CH_2CH_2CH_2NHCH(CH_3)CH_2COOH$$

where R is a mixture of radicals derived from tallow acids, were subjected to ultra-violet irradiation in an open vessel for a period of 7 hours, using nitrogen for purposes of agitation. The samples were then allowed to stand protected from light at room temperature for approximately 17 hours. The temperature of the oil during the ultra-violet irradiation was 115° F. The filterability of the oil was determined in the manner described in Exmple I except that the time was measured for the flow of a 500 cc. sample through a 400-mesh screen having a spacing of 37 microns. The control sample had a filterability of 73.0 seconds per 500 cc. and contained 64.5 mg. of insoluble sludge per liter of oil. The test sample had a filterability of 68.2 seconds per 500 cc. and contained 28.5 mg. of insoluble sludge per liter of oil.

The test sample exhibited excellent emulsification characteristics when tested in manner described in Example I.

*Example VI*

A series of samples comprised of a 50-50 blend of straight run and catalytically cracked distillates, one sample containing no additive and the remainder containing 50 parts per million of a chemical additive as hereinafter described were tested for corrosiveness in the following manner:

20 parts by weight of tap water and 180 parts by weight of the oil were mixed and poured over a number 10-20 sand-blasted mild steel coupon into an open container which was allowed to stand open to the air for one week at room temperature. At the end of this time the coupons were checked for rust spots and pitting.

The control sample exhibited severe rusting and pitting on the entire surface of the steel coupon.

The test sample containing 50 parts per million of a compound of a formula $$RNH_2CH_2CH_2CH_2NHCH(CH_3)CH_2COOH$$

wherein R is a mixture of radicals derived from soybean acids, exhibited no rusting or pitting of the steel coupon.

The test sample containing 50 parts per million of the secondary di-n-butyl amine salt of a compound having the formula $$RNH_2CH_2CH_2CH_2NHCH(CH_3)CH_2COOH$$

wherein R is a mixture of radicals derived from tallow acids, exhibited no rusting or pitting of the steel coupon.

The test sample containing 50 parts per million of the secondary di-coco amine salt of a compound having the formula $$RNH_2CH_2CH_2CH_2NHCH(CH_3)CH_2COOH$$

wherein R is a mixture of radicals derived from tallow acids, exhibited no rusting or pitting of the steel coupon.

The test sample containing 50 parts per million of the sodium salt compound having the formula $$RNH_2CH_2CH_2CH_2NHCH(CH_3)CH_2COOH$$

wherein R is a mixture of radicals derived from tallow acids, exhibited only slight rusting and no pitting of the steel coupon.

The test sample containing 50 parts per million of the calcium salt of a compound having the formula $$RNH_2CH_2CH_2CH_2NHCH(CH_3)CH_2COOH$$

wherein R is a mixture of radicals derived from tallow acids, exhibited no rusting and no pitting of the steel coupon.

While this invention has been described and exemplified in terms of its preferred embodiments, those skilled in the art will appreciate that modifications can be made without departing from the spirit and scope of the invention.

We claim:

1. An improved fuel oil composition containing as an additive a minor amount, in the range between about 25 parts per million and 2 weight percent, of a compound selected from the group consisting of: (I) A compound of the formula $R-NH-(CH_2)_nNH-A-COOH$ wherein A is a divalent hydrocarbon radical having from 2 to 3 carbon atoms, $n$ is an integer of from 2 to 5, and R is a radical of the group consisting of: (A) aliphatic hydrocarbon radicals having from 8 to 22 carbon atoms; and (B) hydrocarbon radicals as contained in rosin and tall oil acids; (II) An alkali metal salt of I; (III) An alkaline earth metal salt of I; (IV) A monoamine salt of I wherein the monoamine is one of the formulae $RNH_2$, $R_2NH$ and $R_3N$, wherein R is a radical of the group consisting of aliphatic hydrocarbon radicals having from 1 to 22 carbon atoms and hydrocarbon radicals as contained in rosin and tall oil acids; (V) A diamine salt of I wherein the diamine is of the formula $$R'NH(CH_2)_nNH_2$$

wherein R' is of the group consisting of aliphatic hydrocarbon radicals having from 8 to 22 carbon atoms and hydrocarbon radicals as contained in rosin and tall oil acids, and $n$ is an integer of from 2 to 5; and (VI) A lower alkyl ester of I.

2. An improved fuel oil composition containing as an additive a minor amount, in the range between about 25 parts per million and 2 weight percent, of a compound of the formula $RNH(CH_2)_nNH-A-COOH$, wherein A is a divalent hydrocarbon radical having from 2 to 3 carbon atoms, $n$ is an integer of from 2 to 5 and R is a radical of the group consisting of (A) aliphatic hydrocarbon radicals having from 8 to 22 carbon atoms; and (B) hydrocarbon radicals as contained in rosin and tall oil acids.

3. An improved fuel oil composition containing as an additive a minor amount, in the range between about 25 parts per million and 2 weight percent, of a compound having the formula $RNH(CH_2)_nNH-A-COOH$, wherein A is a divalent hydrocarbon radical having from 2 to 3 carbon atoms, $n$ is an integer of from 2 to 5, and R is an aliphatic hydrocarbon radical having from 8 to 22 carbon atoms.

4. An improved fuel oil composition containing as an additive a minor amount, in the range between about 25 parts per million and 2 weight percent, of a compound having the formula $$RNHCH_2CH_2CH_2NHCH(CH_3)CH_2COOH$$

wherein R is a mixture of hydrocarbon radicals as contained in tallow fatty acids.

5. An improved fuel oil composition containing as an additive a minor amount, in the range between about 25 parts per million and 2 weight percent, of an alkali metal salt of a compound represented by the formula $$RNH(CH_2)_nNH-A-COOH$$

wherein A is a divalent hydrocarbon radical having from 2 to 3 carbon atoms, $n$ is an integer of from 2 to 5 and R is a radical of the group consisting of (A) aliphatic hydrocarbon radicals having from 8 to 22 carbon atoms, and (B) hydrocarbon radicals as contained in rosin and tall oil acids.

6. An improved fuel oil composition containing as an additive a minor amount, in the range between about 25 parts per million and 2 weight percent, of an alkali metal salt of a compound represented by the formula $$RNH(CH_2)_nNH-A-COOH$$

wherein A is a divalent hydrocarbon radical having from 2 to 3 carbon atoms, $n$ is an integer of from 2 to 5 and R is an aliphatic hydrocarbon radical having from 8 to 22 carbon atoms.

7. An improved fuel oil composition containing as an additive a minor amount, in the range between about 25 parts per million and 2 weight percent, of the sodium salt of a compound having the formula $$RNHCH_2CH_2CH_2NHCH(CH_3)CH_2COOH$$

wherein R is a mixture of hydrocarbon radicals as contained in tallow fatty acids.

8. An improved fuel oil composition containing as an additive a minor amount, in the range between about 25 parts per million and 2 weight percent, of an alkaline earth salt of a compound represented by the formula $$RNH(CH_2)_nNH—A—COOH$$

wherein A is a divalent hydrocarbon radical having from 2 to 3 carbon atoms, $n$ is an integer of from 2 to 5 and R is a radical of the group consisting of (A) aliphatic hydrocarbon radicals having from 8 to 22 carbon atoms, and (B) hydrocarbon radicals as contained in rosin and tall oil acids.

9. An improved fuel oil composition containing as an additive a minor amount, in the range between about 25 parts per million and 2 weight percent, of an alkaline earth salt of a compound represented by the formula $$RNH(CH_2)_nNH—A—COOH$$

wherein A is a divalent hydrocarbon radical having from 2 to 3 carbon atoms, $n$ is an integer of from 2 to 5 and R is an aliphatic hydrocarbon radical having from 8 to 22 carbon atoms.

10. An improved fuel oil composition containing as an additive a minor amount, in the range between about 25 parts per million and 2 weight percent, of calcium salt of a compound having the formula $$RNHCH_2CH_2CH_2NHCH(CH_3)CH_2COOH$$

wherein R is a mixture of hydrocarbon radicals as contained in tallow fatty acids.

11. An improved fuel oil composition containing as an additive a minor amount, in the range between about 25 parts per million and 2 weight percent, of a salt of a compound having the formula $$RNH(CH_2)_nNH—A—COOH$$

wherein A is a divalent hydrocarbon radical having from 2 to 3 carbon atoms, $n$ is an integer of from 2 to 5 and R is a radical of the group consisting of (A) aliphatic hydrocarbon radicals having from 8 to 22 carbon atoms, and (B) hydrocarbon radicals as contained in rosin and tall oil acids, and a monoamine of the formulae $RNH_2$, $R_2NH$ and $R_3N$, wherein R is of the group consisting of aliphatic hydrocarbon radicals having from 1 to 22 carbon atoms and hydrocarbon radicals as contained in rosin and tall oil acids.

12. An improved fuel oil composition containing as an additive a minor amount, in the range between about 25 parts per million and 2 weight percent, of a salt of a compound having the formula $$RNH(CH_2)_nNH—A—COOH$$

wherein A is a divalent hydrocarbon radical having from 2 to 3 carbon atoms, $n$ is an integer of from 2 to 5 and R is an aliphatic hydrocarbon radical having from 8 to 22 carbon atoms, and a monoamine of the formulae $RNH_2$, $R_2NH$ and $R_3N$, wherein R is an aliphatic hydrocarbon radical having from 1 to 22 carbon atoms.

13. An improved fuel oil composition containing as an additive a minor amount, in the range between about 25 parts per million and 2 weight percent, of a salt of secondary dicoco amine and a compound represented by the formula $$RNHCH_2CH_2CH_2NHCH(CH_3)CH_2COOH$$

wherein R is a mixture of hydrocarbon radicals as contained in tallow fatty acids.

14. An improved fuel oil composition containing as an additive a minor amount, in the range between about 25 parts per million and 2 weight percent, of a salt of a compound represented by the formula $$RNH(CH_2)_nNH—A—COOH$$

wherein A is a divalent hydrocarbon radical having from 2 to 3 carbon atoms, $n$ is an integer of from 2 to 5 and R is a radical of the group consisting of (A) aliphatic hydrocarbon radicals having from 8 to 22 carbon atoms, and (B) hydrocarbon radicals as contained in rosin and tall oil acids, and a diamine of the formula $$RNH(CH_2)_nNH_2$$

wherein R and $n$ are as hereinbefore defined.

15. An improved fuel oil composition containing as an additive a minor amount, in the range between about 25 parts per million and 2 weight percent, of a salt of a compound represented by the formula $$RNH(CH_2)_nNH—A—COOH$$

wherein A is a divalent hydrocarbon radical having from 2 to 3 carbon atoms, $n$ is an integer of from 2 to 5 and R is an aliphatic hydrocarbon radical having from 8 to 22 carbon atoms, and a diamine of the formula $$RNH(CH_2)_nNH_2$$

wherein R and $n$ are as hereinbefore defined.

16. An improved fuel oil composition containing as an additive a minor amount, in the range between about 25 parts per million and 2 weight percent, of a salt of a diamine of the formula $$RNHCH_2CH_2CH_2NH_2$$

and an acid having the formula $$RNHCH_2CH_2CH_2NHCH(CH_3)CH_2COOH$$

wherein in each instance R is a mixture of hydrocarbon radicals as contained in tallow fatty acids.

17. An improved fuel oil composition containing as an additive a minor amount, in the range between about 25 parts per million and 2 weight percent, of a lower alkyl ester of a compound represented by the formula $$RNH(CH_2)_nNH—A—COOH$$

wherein A is a divalent hydrocarbon radical having from 2 to 3 carbon atoms, $n$ is an integer of from 2 to 5 and R is of the group consisting of (A) aliphatic hydrocarbon radicals having from 8 to 22 carbon atoms and (B) hydrocarbon radicals as contained in rosin and tall oil acids.

18. An improved fuel oil composition containing 50 to 100 parts per million of a compound having the formula $$RNHCH_2CH_2CH_2NHCH(CH_3)CH_2COOH$$

wherein R is a mixture of hydrocarbon radicals as contained in tallow acids.

19. An improved fuel oil composition containing 50 to 100 parts per million of the sodium salt of a compound having the formula $$RNHCH_2CH_2CH_2NHCH(CH_3)CH_2COOH$$

wherein R is a mixture of hydrocarbon radicals as contained in tallow acids.

20. An improved fuel oil composition containing 50 to 100 parts per million of the calcium salt of a compound having the formula $$RNHCH_2CH_2CH_2NHCH(CH_3)CH_2COOH$$

wherein R is a mixture of hydrocarbon radicals as contained in tallow acids.

References Cited in the file of this patent

UNITED STATES PATENTS

| | | |
|---|---|---|
| 2,312,082 | Dietrich | Feb. 23, 1943 |
| 2,320,392 | White | June 1, 1943 |
| 2,686,776 | Keim | Aug. 17, 1954 |